United States Patent
Ito et al.

(10) Patent No.: US 6,901,684 B2
(45) Date of Patent: Jun. 7, 2005

(54) METHOD FOR PRODUCING CERIUM-BASED ABRASIVE AND CERIUM-BASED ABRASIVE PRODUCED THEREBY

(75) Inventors: Terunori Ito, Tokyo (JP); Yoshitsugu Uchino, Tokyo (JP); Kazuya Ushiyama, Tokyo (JP); Yuki Nakashima, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/483,890

(22) PCT Filed: May 12, 2003

(86) PCT No.: PCT/JP03/05890

§ 371 (c)(1),
(2), (4) Date: Jan. 15, 2004

(87) PCT Pub. No.: WO03/097761

PCT Pub. Date: Nov. 27, 2003

(65) Prior Publication Data

US 2004/0182954 A1 Sep. 23, 2004

(30) Foreign Application Priority Data

May 16, 2002 (JP) ........................................ 2002-141760

(51) Int. Cl.$^7$ .................................................. F26B 5/14
(52) U.S. Cl. ............................. 34/305; 34/347; 34/384; 34/391; 34/401; 51/307
(58) Field of Search ......................... 34/320, 305, 334, 34/343, 347, 381, 384, 391, 397, 401; 106/3, 287.11; 451/231, 80; 51/307, 309

(56) References Cited

U.S. PATENT DOCUMENTS 5,470,368 A * 11/1995 Culler ........................ 51/298
5,496,387 A * 3/1996 Culler ........................ 51/295
5,593,339 A * 1/1997 Yam et al. ................... 451/36
6,096,185 A * 8/2000 Corlett et al. ............... 205/742
6,562,092 B1 * 5/2003 Ito et al. ..................... 51/309
6,824,578 B2 * 11/2004 Uchino et al. ............... 51/307

FOREIGN PATENT DOCUMENTS

| EP | 875547 A2 | 11/1998 |
| JP | 9-183966 | 7/1997 |
| JP | 10-106991 A | 4/1998 |
| JP | 11-269455 | 10/1999 |

OTHER PUBLICATIONS

On chemo–mechanical polishing of silicon nitride work material with various abrasives by Ming et al. dated 1998 from Oklahome State University Journal.*

* cited by examiner

Primary Examiner—Stephen Gravini
(74) Attorney, Agent, or Firm—Rothwell, Figg, Ernst & Manbeck, P.C.

(57) ABSTRACT

This invention is a method for producing a cerium-based abrasive which includes: a step of grinding raw material for the cerium-based abrasive; a step of roasting the ground raw material; and a step of subjecting the roasted raw material to wet processing, the method being characterized in that it further includes a lower-temperature re-roasting step of heating the wet-processed raw material at 200 to 700° C. In the invention disclosed in this application, an abrasive with particularly preferable properties can be produced by fully drying the wet-processed raw material in a drying step, and subsequently subjecting the dried raw material to the lower-temperature re-roasting step.

13 Claims, No Drawings

METHOD FOR PRODUCING CERIUM-BASED ABRASIVE AND CERIUM-BASED ABRASIVE PRODUCED THEREBY

CROSS REFERENCE TO RELATED APPLICATION

This application is a 35 USC § 371 National Phase Entry Application from PCT/JP03/05890, filed May 12, 2003, and designating the U.S.

TECHNICAL FIELD OF THE INVENTION

This invention relates to a method for producing cerium-based abrasive, in particular, to a method for producing cerium-based abrasive, characterized in that it includes processing that is carried out after roasting the raw material for the abrasive.

EARLIER TECHNOLOGY

Traditionally, many cerium-based abrasive (hereinafter also referred to simply as abrasive) have been used for polishing optical lenses, and in recent years, they have been widely used as abrasive for glass material that are used in electric/electronic equipment, in particular, for glasses for magnetic recording media such as hard disks and glass substrates for liquid crystal displays (LCDs).

Cerium-based abrasive is produced using, as raw material, cerium-based rare earth carbonates, which are obtained from bastnasite or Chinese complex ore, or cerium-based rare earth oxides, which are obtained by calcining rare earth carbonates at high temperatures in advance, in the following manner.

First, the raw material for cerium-based abrasive is ground, subjected to chemical treatment (treatment to remove alkaline metals, such as sodium, which may cause abnormal grain growth at the time of roasting (mineral acid treatment) and treatment to add a fluorine component so as to ensure abrasiveness of the cerium-based abrasive and smoothness of the polished surface (fluorine treatment)), filtered, and dried. Then, the raw material is heated and roasted so that the raw material particles are properly sintered among themselves, and the sintered raw material is re-ground and the re-ground raw material is classified so as to produce abrasive having desired grain diameter and grain size distribution (the prior art related to the above production process for producing cerium-based abrasive includes, for example, Japanese Patent Laid-Open No. 9-183966 and Japanese Patent Laid-Open No. 11-269455).

One of the properties that abrasive products are required to have is the capability of forming scratch-free and high-accuracy polished surfaces. Particularly in glass substrates for use in magnetic recording media that can accommodate recent high-density and high-speed recording, their polished surfaces require great accuracy in terms of their smoothness etc. The smoothness of the polished surfaces is considered to be related to the presence or absence of coarsened particles, and desirably abrasive do not contain coarsened particles.

Thus, techniques have been examined which can reduce the coarse particle content in abrasive. For example, there have been reported techniques in which classification requirements in the above production process are appropriately adjusted for the roasted and re-ground raw material and in which a step of removing coarsened particles is added to the production process. As a relatively simple and easy technique for reducing the coarse particle content in abrasive, one is known which applies wet processing to the roasted raw material. The wet processing is, for example, to grind the roasted raw material in a solvent (wet grinding) with a grinder such as atritor, ball mill or bead mill or to grind the roasted raw material dry or wet and then classify the same wet (wet classification). These types of wet processing grind and classify the raw material while properly dispersing the same in a solvent, whereby they can process the raw material without permitting coarsened particles to remain therein. And abrasive can be produced only if the raw material after wet processing is dried.

In the abrasive produced through the wet processing, since the coarse particle content is reduced, they can inhibit occurrence of scratches in the surfaces polished therewith and form high-accuracy polished surfaces. But, on the other hand, an examination made by the inventors of this invention has shown that inferior abrasiveness and unsatisfactory polishing speed are problems with the abrasive. The abrasiveness is a property that cannot be ignored, taking into consideration the polishing operation efficiency in the polishing process.

This invention has been made in the light of the above described background. Accordingly, the object of this invention is to provide a method for producing abrasive which has low coarse particle contents, can form high-accuracy polished surfaces, and are ensured much higher abrasiveness.

SUMMARY OF THE INVENTION

In order to solve the above problems, the inventors of this invention first examined abrasive that are produced through wet processing of their raw material after roasting, and then investigated the relation between the wet processing and the abrasiveness of the abrasive. As a result, they found that the abrasive produced through the wet processing contain hydroxides of rare earth elements (e.g. cerium). One factor which produces the rare earth hydroxides is possibly that, though the raw material of the abrasive is formed into rare earth oxides after they undergo the roasting operation, the rare earth oxides react with a solvent in the subsequent wet processing and part of them is changed into hydroxides. And all the hydroxides produced in the wet processing are not turned into oxides in drying process, but part of them remains as they are. According to the inventors, the rare earth hydroxides are soft and do not have a polishing function. Accordingly, the abrasive produced through the wet processing have a low content of useful polishing particles (particles having a polishing function), resulting in low abrasiveness.

Then, the inventors considered that to obtain abrasive having a higher abrasiveness, it is necessary to add a step of changing the hydroxides produced though the wet processing into oxides before the hydroxides are brought to the subsequent step to be made into finished products. And they found that as means for changing the hydroxides into oxides, it is advantageous to add a step of heat treating the raw material having undergone wet pressing at a specified temperature (lower-temperature re-roasting step) and thought of this invention.

Specifically, this invention is a method for producing cerium-based abrasive which includes: a step of grinding the raw material for the cerium-based abrasive; a step of roasting the ground raw material; and a step of subjecting the roasted raw material to wet processing, the method being characterized in that it further includes a lower-temperature re-roasting step of re-roasting the raw material having undergone the wet processing by heat at 200 to 700° C.

The lower-temperature re-roasting step is to change the rare earth hydroxides produced through the wet processing into oxides by heating the raw material having undergone the wet processing at temperatures lower than the roasting temperature in the roasting step. The temperature requirement for the lower-temperature re-roasting step is set for 200 to 700° C. The reason for this is that if the temperature is lower than 200° C., the change of rare earth hydroxides into oxides is hard to occur, which inhibit the improvement in polishing speed of abrasive. If the heating temperature is more than 700° C., the raw material is sintered and coarsened particles are increased in the raw material, which may cause scratches in polished surfaces. The particularly preferable heating temperature range is 200 to 500° C.

As to the heating duration, preferably it is set for 0.5 to 60 hours. If the duration is shorter than 0.5 hours, the change of the hydroxides into the oxides does not occur, whereas if the duration exceeds 60 hours, the effect is not increased, but there arises a possibility of causing scratches in polished surfaces. Taking production efficiency into consideration, it is particularly preferable to set the heating duration for 1 to 40 hours. The heating duration is controlled in relation to the heating temperature, and when the heating temperature is relatively high, preferably the heating duration is shortened.

As an apparatus for the lower-temperature re-roasting step, the same apparatus as that of the first roasting step, such as fixed furnace and rotary kiln, can be used.

The lower-temperature re-roasting step of this invention may be conducted by directly heating the raw material which has undergone the wet processing and are in the slurry state (hereinafter the case is referred to as direct lower-temperature roasting where the lower-temperature re-roasting is conducted by directly heating the raw material in the slurry state), or may be conducted in the steps of: subjecting the raw material slurry to solid-liquid separation by filtration etc., depending on the situation, and to drying operation; and heating the dried raw material.

In the direct lower-temperature roasting, both drying and lower-temperature re-roasting of the raw material having undergone the wet processing can be conducted at the same time (specifically, both the drying step and the lower-temperature re-roasting step can be conducted at the same time if the drying temperature in the drying step is set for the same temperature as that of the lower-temperature re-roasting). Preferably the direct lower-temperature re-roasting is conducted by spraying and heating the abrasive slurry which is obtained through the wet processing. Since the drying apparatus (spray drier etc.) used in the drying step is used as the apparatus for the direct lower-temperature roasting, abrasive can be produced effectively. In the direct lower-temperature re-roasting with a spray drier, since the duration that the abrasive slurry stays within the heating chamber is short, in order to perform a satisfactory lower-temperature re-roasting, it is preferable not only to set the maximum temperature in the heating chamber (the inlet temperature in a parallel flow type, the outlet temperature in a countercurrent flow type) for 200 to 700° C., but also to set the minimum temperature in the heating chamber (the outlet temperature in a parallel flow type, the inlet temperature in a countercurrent flow type) for 200° C. or higher.

When performing the drying step and the lower-temperature re-roasting step at the same time, there is a possibility of causing dry aggregate of the raw material particles, and hence coarsened particles. Further, when performing the drying step and the lower-temperature re-roasting step at the same time, since not only the heat for the lower-temperature re-roasting, but also the heat for the drying is required, change of the hydroxides into oxidation might not occur satisfactorily even if they are heated at the above heating temperatures.

Thus, to inhibit the occurrence of coarsened particles, preferably the method includes, before the lower-temperature re-roasting step, another drying step of drying the raw material having undergone the wet processing. In other words, abrasive with more preferable properties can be produced by fully drying the raw material having undergone the wet processing at decreased temperatures and further heating the dried raw material so that they undergo lower-temperature re-roasting.

The term "drying" used in this invention herein disclosed means a step of evaporating and removing moisture adhered to the raw material having undergone the wet processing until the loss on drying becomes 3% by weight in the loss on drying test (test under the drying conditions: at 105° C., for 2 hours, at atmospheric pressure) speculated in JIS-K0067. This drying step may be conducted by the commonly used procedure in which the raw material having undergone the wet processing are filtered, dehydrated, and left stand still and heated in a furnace; however, the inventors consider the following two drying procedures to be preferable, from the viewpoint of inhibiting the occurrence of coarsened particles.

The first preferable drying procedure is to spray and heat the abrasive slurry obtained through the wet processing. This drying by spraying (hereinafter also referred to as spray drying) is to dry the slurry obtained through the wet processing without filtering the same, in particular, to spray the abrasive slurry in a drying chamber by rotating disc-type or nozzle-type spraying means and bring the sprayed mist-like abrasive slurry into contact with a heated gas so that they are dried. This spray drying permits abrasive particles in the slurry to be dried instantaneously while separating them from each other, as a result, it inhibits the aggregate of the abrasive particles from occurring at the time of drying, whereby abrasive can be obtained in which the formation of coarsened particles are avoided. Further, by the spray drying, the abrasive slurry can be dried and formed into abrasive powders in an extreme short period of time, since they are released in a heated gas in the mist state. And drying can be conducted effectively without carrying out filtration/dehydration operations which are required in the ordinary drying steps.

In more particular, the spray drying is to dry the raw material slurry having undergone the wet processing while spraying the same in a drying chamber, such as spray drier, by rotating disc-type spraying means or nozzle-type spraying means, such as two-fluid nozzle-type or pressure nozzle-type means. The slurry at the time of spraying may be as-wet ground slurry, however it is preferable to adjust their solid (raw material particles) contents to 1% by weight to 50% by weight (preferably 10% by weight to 40% by weight).

As spraying means for spraying the abrasive slurry, rotating disc-type, or nozzle-type such as two-fluid nozzle-type or pressure nozzle-type spraying means can be used; however, preferably rotating disc-type or two-fluid nozzle-type is used. The reason is that the use of such spraying means makes it easier to bring the sprayed abrasive slurry in the mist state, which ensures prevention of dry aggregate from occurring. When using a rotating disc-type spray, generally and preferably the circumferential speed of the peripheral edge of the disc is in the range of 10 to 200 m/sec (preferably 50 m/sec or higher and more preferably 100 m/sec or higher). The higher the circumferential speed becomes, the finer droplets can be obtained, which inhibits the formation of coarsely coalesced particles. When using a two-fluid nozzle-type spray, suitably the slurry feeding pressure (the discharge pressure of the feed pump) is 0.29 MPa to 0.98 MPa and the spray pressure (the pressure of gas (usually air)) is 0.29 MPa to 0.98 MPa. It is not preferable that either of the above pressures is lower than the minimum value, because the dispersion at the time of spraying becomes insufficient and the particles obtained become too large. It is not preferable either that either of the above pressures is higher than the maximum value, because the spray becomes non-uniform and both fine particles and coarsened particles are increased. When using a pressure nozzle-type spray, for the same reasons as above, preferably the spray pressure is 0.98 MPa to 29.4 MPa.

When using nozzle-type spraying means, preferably the nozzle diameter is 0.1 mm or more and 2.0 mm or less. The reason is that if the diameter is larger than the maximum value, the droplets formed are too large to dry the abrasive slurry and aggregate of abrasive particles is likely to occur at the time of drying. Taking into consideration all the factors such as productivity, degree of clogging and size of droplets, more preferably the nozzle diameter is 0.1 mm to 1 mm.

Preferably, the temperature of the atmosphere in which the droplets of the abrasive slurry formed by spraying are dried, in other words, the temperature of the inside of the drying chamber is 120° C. to 300° C. If the temperature is more than 300° C., coarsened particles are likely to be produced due to dry aggregate. From this viewpoint, more preferably the temperature is 200° C. or less. And to securely prevent coarsely coalesced particles from being formed, much more preferably the maximum temperature of the atmosphere is 150° C. or less. Spray dryers fall into several types depending on the directions of spraying and of hot air flow: a parallel flow type, a countercurrent flow type, a parallel and countercurrent flow type (a mixed type), etc., and any one of the types can be used.

The second preferable drying procedure is to heat the abrasive slurry while applying vibration thereto. The procedure for drying while applying vibration to the abrasive slurry (hereinafter also referred to as vibration drying) is, for example, to introduce the abrasive slurry obtained through the wet processing, which are the objects to be dried, into a drying container vibratily placed and dry the abrasive slurry while moving the same by vibrating the drying container. Another means is also applicable in which the abrasive slurry are fed onto a fluidized bed which uses a perforated plate and dry the same while vibrating the fluidized bed. Applying vibration to the abrasive slurry at the time of drying permits the production of abrasive that hardly causes scratches on the polished surfaces, since it prevents the aggregate of abrasive particles from occurring.

Preferably the frequency of the vibration in the vibration drying is 20 Hz or more, particularly preferably 25 Hz or more. The reason is that setting the frequency for such values is highly effective in inhibiting the dry aggregate of abrasive particles. Preferably the solid content in the abrasive slurry at the beginning of the vibration drying is 5% by weight to 50% by weight. If the solid content is less than 5% by weight, rapid drying is hard to perform, resulting in high drying costs. On the other hand, to obtain abrasive slurry with a solid content of more than 50% by weight, the drying process should be made more complex, since it requires another step, in particular, a concentrating step of concentrating the abrasive slurry by heat vaporization etc. Preferably the drying duration is 1 to 24 hours, though it varies depending on the factors such as concentration of the slurry, drying temperature and pressure of the atmosphere at the time of drying. The temperature of the atmosphere of the abrasive slurry is preferably 200° C. or less at the time of drying. This is because if the temperature is higher than 200° C., the dry aggregate of abrasive particles is likely to occur. However, the temperature of the atmosphere is preferably 30° C. or more. This is because if the temperature is lower than 30° C., the drying operation requires more time, resulting in low operation efficiency.

In the above two drying procedures, preferably the atmosphere of the abrasive slurry is a vacuum atmosphere, in other words, an atmosphere in which the pressure is lower than atmospheric pressure. Conceivably, vaporization of solvents is accelerated, rapid drying is made possible, and dry aggregate of abrasive particles is hard to occur in such circumstances. When the method for producing abrasive includes a drying step before the lower-temperature re-roasting step, the abrasive raw material can be crushed before the lower-temperature re-roasting step. Particularly when the drying step is conducted by a procedure other than the above two, it is preferable to perform a dry milling to break up the aggregate of abrasive particles.

As means for inhibiting the dry aggregate of abrasive particles effectively, it is preferable to add an organic solvent to the abrasive slurry, which is object to be dried. Organic solvents applicable are not limited to any specific ones, as long as their solubility in a solution is 1% or more. For example, when a solution consisting of water or mainly of water (water-base solvent) is used as a solvent, preferably an organic solvent is used whose solubility in water is 1% or more. If an organic solvent whose solubility in water is less than 1% is used, the use of the organic solvent cannot sometimes be sufficiently effective in inhibiting the dry aggregate of abrasive particles, since its affinity for water is too low. In this respect, it has been already known that many of the preferable organic solvents are those whose solubility in water is high. The preferable organic solvents include, for example, alcohols such as methanol, ethanol, 1-propanol(n-propyl alcohol), 2-propanol(isopropyl alcohol), 2-methyl-1-propanol(isobutyl alcohol), 2-methyl-2-propanol(tert-butyl alcohol), 1-butanol(n-butyl alcohol) and 2-butanol(sec-butyl alcohol); polyhydric alcohols such as 1,2-ethanediol (ethylene glycol), 1,2-propanediol(propylene glycol), 1,3-propanediol(trimethylene glycol) and 1,2,3-propanetriol (glycerol); ketones such as acetone and 2-butanone(methyl ethyl ketone); tetrahydrofuran; N,N-dimethylformamide; dimethyl sulfoxide; and 1,4-dioxane.

Preferably, the concentration of the organic solvent in the abrasive slurry solvent is 0.1% by weight to 30% by weight at the beginning of drying. This is because if the concentration of the organic solvent in the abrasive slurry solvent is lower than 0.1% by weight, the addition of the organic solvent cannot sometimes produce sufficient effect of inhibiting the aggregate of abrasive particles. And even if an organic solvent is added to the abrasive slurry solvent so that its concentration is higher than 30% by weight, the effect of inhibiting the aggregate of abrasive particles is hardly increased, as long as the organic solvent is added with water completely removed therefrom and so that its concentration is 100% by weight, resulting in high drying costs.

When adding an organic solvent, preferably the temperature of the abrasive slurry atmosphere in the drying step is lower than the boiling point of the organic solvent added. Generally the preferable temperature is 30° C. to 100° C.

As described so far, since this invention is on the basis of subjecting the abrasive raw material to the wet processing, according to this invention, abrasive can be produced which are capable of inhibiting the occurrence of coarsened particles, and hence forming polished surfaces free from scratches. And the lower-temperature re-roasting process, which is the characteristic of this invention, permits the change of the rare earth hydroxides formed by the above wet processing into oxides, which ensures the abrasiveness of the abrasive produced. The combination of the wet processing and the lower-temperature re-roasting process produces the synergistic effect, which permits the production of cerium-based abrasive having excellent polishing properties. Further, the combination of this invention with the drying step makes more effective the inhibition of coarsened particles from occurring, leading to the production of much more preferable abrasive.

This invention is characterized in that it includes the steps of: subjecting the roasted raw material to wet processing; and subjecting the raw material having undergone the wet processing to the lower-temperature re-roasting process. Accordingly, the steps before the wet processing are not particularly limited.

For example, in the grinding step of grinding the raw material, either dry grinding or wet grinding can be employed (generally wet grinding is applied), and when employing the wet grinding process, it can be conducted with any one of the grinders such as atritor, ball mill or bead mill. Further, in addition to these mechanical grinding processes commonly in use, a grinding process may also be applied in which the raw material is heated while immersed in an aqueous solution. As to this process, the applicants of this invention have confirmed that it is useful when the raw material includes cerium-based rare earth carbonates, or cerium-based rare earth carbonates together with cerium-based rare earth oxides. (For further details of this grinding process, refer to International Publication No. WO 02/097004.) As to the roasting step, apparatus and conditions can be applied which are employed in the common methods for producing cerium-based abrasive.

Dry milling can be conducted before the lower-temperature re-roasting step.

As the wet processing after the roasting step, is preferably applied a process in which the roasted raw material is subjected to wet grinding, specifically, the roasted raw material is ground wet with a grinder such as atritor, ball mill or bead mill or in which the roasted raw material is subjected to dry grinding or wet grinding and then the ground raw material is classified wet. Even when employing wet grinding, there are cases where the abrasive particles in the raw material have coalesced/set in whole or in part due to the roasting operation; therefore, if the roasted raw material is ground (crushed) dry as a pre-step of the wet grinding, the grinding efficiency of the wet grinding can be improved.

The cerium-based abrasive produced by the above processes can have more preferable polishing properties if the content of cerium oxide, lanthanum oxide and fluorine is restricted so that it falls in a specified range.

Specifically, they can be more preferable abrasive if the cerium oxide content (by weight ratio to the total rare earth oxide content (hereinafter referred to as TREO) is restricted within the range of 50 to 95%, the lanthanum oxide content (weight ratio to TREO) within the range of 5 to 50%, and the fluorine content (weight ratio to the entire abrasive) within the range of 5% or less.

The reason that the preferable cerium oxide content is considered to be in the above range, though generally the preferable cerium oxide content is considered to be in the range of 40% or more, is that in the abrasive produced through the lower-temperature re-roasting step, if the cerium oxide content is less than 50%, the polishing speed is improved, but sufficient polishing speed cannot be obtained. On the other hand, if the cerium oxide content is more than 95%, the effect of the lower-temperature re-roasting process becomes low, because the amount of the hydroxides formed is decreased in the wet processing.

The reason the preferable lanthanum oxide content is considered to be in the above range is that if the content is less than 5%, the amount of the hydroxides formed is decreased in the wet processing and the effect of the lower-temperature re-roasting process becomes low. On the other hand, if the content is more than 50%, the polishing speed is improved, but sufficient polishing speed cannot be obtained.

As to the fluorine content, the above fluorine content range is considered to be preferable, since the improvement in polishing speed is more remarkable when applying this invention to the abrasive containing no fluorine or less fluorine, though the method of this invention is applicable to the production of both abrasive containing fluorine and abrasive containing no fluorine.

The cerium-based abrasive whose cerium oxide content etc. are restricted can be produced by adjusting the compositions of their raw material and applying the method of this invention to the raw material in which their compositions have been adjusted.

The content of cerium oxide and lanthanum oxide can be adjusted by, for example, adding a precipitant, such as ammonium carbonate, ammonium hydrogencarbonate, oxalic acid, ammonium oxalate, aqueous ammonia and urea, to a rare earth solution having a composition within the above described range to form a precipitate and using as-formed precipitate or the precipitate having undergone pre-roasting as a raw material. In this technique, the rare earth solution can be used as a raw material for an abrasive if two or more kinds of rare earth raw material are properly dissolved in an acid or separated by solvent extraction.

The content of cerium oxide and lanthanum oxide can also be adjusted if rare earth carbonate, rare earth oxide, rare earth oxalate, rare earth hydroxide, etc. are mixed to give a composition in the above range used as a raw material. For example, their content can be adjusted by mixing cerium carbonate and lanthanum carbonate.

As to the adjustment of the fluorine content, when using the raw material produced by the above two raw material adjusting techniques, the adjustment is not required to produce abrasive, because in general such raw material hardly contain fluorine. Fluorine treatment can also be applied so that the fluorine content is 5% or less.

To this invention can be applied not only raw material whose content of cerium oxide and lanthanum oxide is adjusted artificially, but the bastnasite concentrate, which have been traditionally used as a raw material for abrasive. In the latter case, since the content of cerium oxide and lanthanum oxide in the bastnasite concentrate is in the above described range, the adjustment is not required. However, since bastnasite often contains 5% or more of fluorine, it can be used in the form of a mixture with a raw material that hardly contains fluorine (the raw material produced by the above techniques).

EMBODIMENTS OF THE INVENTION

In the following this invention will be described in terms of its embodiments.

First Embodiment

A cerium-based rare earth oxide (produced in China) was prepared as a raw material. TREO of the raw material was 99%, $CeO_2$/TREO was 60%, and $La_2O_3$/TREO was 30%. Twenty-five kg of the raw material, 25 kg of deionized water and 140 kg of grinding medium were introduced into a grinding container of a wet ball mill so that the raw material was ground. The grinding medium was zirconia (YTZ) balls 5 mm in diameter and the capacity of the grinding container was 100 L (liter). And the grinding duration was 8 hours.

After the grinding operation, the raw material was filtered by the filter press method, and the filtered abrasive raw material was stationary dried at 120° C. for 24 hours while kept in a PTFE vat. After the stationary drying, the obtained abrasive raw material was dry ground with a roll crusher. The abrasive raw material obtained through the dry grinding was roasted at 900° C. for 12 hours in an electric furnace while placed on a quartz plate. After the roasting operation, one pass of dry grinding was conducted with Sample Mill (Fuji Paudal Co., Ltd.).

Eighteen kg of the abrasive raw material obtained after the above dry grinding and 72 kg of deionized water were mixed to prepare a slurry, and the slurry was ground (crushed) for 3 hours with a mill. The mill used was Saio: Model SC220/70 (Mitsui Mining Co., Ltd.) and as a grinding medium was used 2.7 kg of zirconia balls 0.8 mm in diameter. The revolution of the rotor positioned within the mill was 1500 rpm. The mill grinds the slurry while circulating the same in a closed-circuit; specifically, it feeds the slurry in its holding tank to its grinding container, grinds the slurry in the grinding container, and returns the ground slurry to the holding tank. The amount of the slurry circulated was 15 liter/min.

An abrasive slurry (hereinafter also referred to simply as slurry) with a solid content of 20% by weight was obtained in the above steps. The measurement of the grain diameter made for the abrasive particles in the slurry showed that the content of the abrasive particles 10 $\mu$m or more in diameter was 40 ppm, the average grain diameter ($D_{50}$) was 0.76 $\mu$m, and the maximum grain diameter was 3.06 $\mu$m. The methods used in this measurement will be described later.

Then the slurry was sprayed so that it was dried. In this spray drying, a parallel flow type of spray drier (manufactured by Okawara Mfg. Co., Ltd., Model L-8) was used. The parallel flow type of spray drier is to spray a slurry in a drying chamber and, in parallel with this spray, spray hot air (air for drying) to dry the slurry. In this embodiment, rotating disc-type spraying means was used. The spraying conditions were as follows: the diameter of the rotating disc (atomizer) was 50 mm, the revolution of the disc was 35000 rpm (circumferential speed 92 m/sec), the amount of the slurry sprayed was 30 mL (milliliter)/min, the temperature of the hot air at the inlet of the chamber (rotating disc position temperature) was 150° C., and the temperature of the hot air at the outlet of the chamber was 50° C.

The dried raw material was subjected to lower-temperature re-roasting treatment. The lower-temperature re-roasting treatment was conducted in such a manner as to seal the dried raw material in a fixed electric furnace and heat the same. As to the heating conditions, the heating temperature was 200° C. and heating duration was 5 hours.

Second to Fourth Embodiments

Abrasive was produced by processing the raw material in the same manner as the first embodiment until the drying step and subjecting the dried raw material to lower-temperature re-roasting while varying the conditions. Specifically, the lower-temperature re-roasting conditions were as follows: the heating temperatures were 300, 500 and 700° C., respectively and the heating duration was 5 hours.

Fifth Embodiment

An abrasive was produced by processing the raw material in the same manner as the first embodiment until the wet processing step, drying the slurry to be dried not by spraying but by applying vibration thereto, and subjecting the dried raw material to lower-temperature re-roasting. Specifically, the slurry to be dried was dried with a vibration drier (manufactured by Chuo Kakohki Co., Ltd.: Model VU). This drier is equipped with vibration applying means for applying vibration to the dryer's container into which the slurry to be dried is introduced and capable of drying the slurry in the container while vibrating the same. The container of the drier has what is called a jacket structure, and the material constituting the container has clearances through which liquid (heat source) such as hot water was allowed to circulate. Accordingly, the inside of the container can be heated by circulating a heating medium through the jacket. In this embodiment, the slurry was dried while vibrating the container with the vibration applying means and heating the container by circulating hot water through the jacket. The drying conditions were as follows: the frequency of the vibration of the container was 30 Hz, the temperature of the container at the time of drying was 60° C., and the internal pressure of the container was 0.0067 MPa.

As to the lower-temperature re-roasting conditions, the heating temperature was 300° C. and the heating duration was 5 hours. The other conditions were the same as those of the first embodiment.

Sixth Embodiment

In this embodiment, an abrasive was produced in such a manner as to add an organic solvent (an additive) to the slurry to be dried, which was obtained in the same steps as those of the first embodiment, dry the slurry to which the organic solvent had been added, and subject the dried slurry to lower-temperature re-roasting. Specifically, the abrasive slurry was dried with a vacuum mixing drier (manufactured by Dalton Co., Ltd.: Model AMV). This drier is equipped with a container having a jacket structure, into which slurry is introduced, and means for agitating the slurry. This drier is also equipped with a vacuum pump, with which the slurry can be dried while keeping the inside of the container airtight and at reduced pressure (vacuum), if necessary.

In this embodiment, first 10 kg of the abrasive slurry (including 8 kg of solvent) to be dried was taken, and 0.42 kg of ethanol (organic solvent) was added thereto to prepare an abrasive slurry with an ethanol content in the solvent of about 5.0%. This slurry was introduced into the dryer's container so that it was dried. The drying conditions were as follows: the temperature of water circulated through the clearances of the container was 50° C. and the internal pressure of the container was 0.0067 MPa. The slurry was agitated by rotating the container at a rotation of 230 rpm and at a revolution of 159 rpm.

As to the lower-temperature re-roasting conditions, the heating temperature was 300° C. and the heating duration was 5 hours. The other conditions were the same as those of the first embodiment.

Seventh Embodiment

In this embodiment, a cerium-based abrasive was produced in such a manner as to subject the raw material having undergone the wet processing directly to lower-temperature re-roasting. The same raw material as that of the first embodiment was subjected to grinding and wet grinding, and the raw material in the slurry state thus obtained (with a solid content of 20% by weight) was spray heated so that it underwent the lower-temperature re-roasting. The heating conditions were as follows: the amount of the slurry sprayed was 20 ml/min, the temperature of the hot air at the inlet of the chamber was 300° C., and the temperature of the hot air at the outlet of the chamber was 230° C.

For comparison with the first to seventh embodiments, the following comparative examples were prepared. In some comparative examples, abrasive was produced in the same steps as those of the embodiments until the drying step, but without the lower-temperature re-roasting step. And in the rest of the comparative examples, abrasive was produced in the same steps, including the lower-temperature re-roasting step, as those of the embodiments; however, the conditions under which the lower-temperature re-roasting was conducted were outside the preferable range.

COMPARATIVE EXAMPLES 1 to 3

In Comparative Example 1, an abrasive was produced in the same steps as those of the first embodiment until the drying step. Similarly, Comparative Examples 2 and 3 correspond to the fifth and sixth embodiments, respectively. However, in all these comparative examples, the lower-temperature re-roasting was not conducted.

COMPARATIVE EXAMPLES 4, 5

In these examples, abrasive was produced in the same steps as those of the first embodiment; however, the conditions under which the lower-temperature re-roasting was conducted were outside the preferable range. Specifically, abrasive was produced in such a manner as to subject the raw material having been dried in the same steps as those of the first embodiment to the lower-temperature re-roasting under the heating conditions of 100° C. and 60 hours and of 800° C. and 5 hours, respectively. Except for these conditions, the lower-temperature re-roasting step was conducted in the same manner as that of the first embodiment.

The concentration of coarsened particles, average grain diameter and maximum grain diameter were measured for the abrasive obtained in the above embodiments and comparative examples, and, based on the measured results, the dispersibility of the abrasive particles in each abrasive slurry was evaluated. Polishing test was also conducted for the abrasive slurry prepared using the above abrasive to evaluate the abrasiveness of the abrasive powders.

Measurement of Coarse Particle Concentration

First, 200 g of each abrasive powder and 800 g of deionized water were mixed to prepare abrasive slurry as objects to be measured. Then, each abrasive slurry and 1 kg of 0.18% aqueous solution of sodium hexametaphosphate were mixed and agitated for 2 minutes. Each slurry obtained after the agitation was filtered through a micro sieve with meshes of 10 μm, and the residue on the sieve was collected. The collected residue was dispersed in 0.1% aqueous solution of sodium hexametaphosphate to form slurry. In this dispersion operation, ultrasonic agitation, which is usually employed, was not conducted. The obtained slurry was filtered through a micro sieve with meshes of 10 μm, and the residue was collected. After this, the operations of forming the collected residue into slurry and filtering the formed slurry were repeated twice, and coarsened particles (particles 10 μm or more in diameter) were collected. The collected coarsened particles were fully dried and weighed, and the concentration of the coarsened particles was obtained based on the weight thereof.

Measurement of Average Grain Diameter and Maximum Grain Diameter

The grain size distribution was measured for each abrasive with a laser diffraction particle size analyzer (manufactured by Shimadzu Corporation: SALD-2000A), and the average grain diameter ($D_{50}$: grain diameter at cumulative volume of 50% from the smaller grain diameter side) was obtained. The objects to be measured in this measuring method are dispersing grain groups consisting of numbers of particles in the dispersed state that exist in emulsions etc. In this measuring method, a grain size distribution is obtained by detecting and analyzing the light intensity distribution pattern of the diffracting/scattering light produced when the dispersing grain groups are exposed to light, and the maximum grain diameter (Dmax) can be obtained based on the measured distribution. Accordingly, the maximum grain diameter (Dmax) is obtained by the measuring method quite different from that of the coarse particle concentration; therefore, its data cannot be simply compared with those of the coarse particle concentration, but can be used as a reference. Thus, the measured results for maximum diameter are shown together with those of average diameter ($D_{50}$) in Table 1.

Polishing Test

Polishing test was conducted in which a glass surface was polished using the abrasive slurry obtained by forming the above abrasive powders into slurry, and the measurement of polishing value and evaluation of polished surface (evaluation of scratches) were made for each of the abrasive slurry. In this polishing test, the surface of glass 65 mmφ for flat panels was polished using a polyurethane pad on a high-speed polishing tester. The solid content of the abrasive slurry used was 10% by weight. Polishing was conducted while feeding each of the abrasive slurry at a rate of 5 liter/min. The pressure of the abrasive pad against the surface to be polished was 76 kPa (780 g/cm$^2$). And the rotational speed of the polishing tester was set for 600 rpm. After completing the polishing, the glass material was washed in deionized water and dried in the dust-free state.

Evaluation of Polishing Value

First, the weight of the glass before and after polishing with each of the abrasive slurry was determined and the loss in weight due to the polishing was calculated. Then, based on the calculated loss in weight, polishing value was obtained for each of the abrasive slurry. The polishing value was used as reference (100) which was obtained when performing polishing using an abrasive slurry obtained through wet milling after roasting and not having been dried.

Scratch Evaluation

The condition of the glass surface obtained after polishing was evaluated. Evaluation was made based on the presence or absence of scratches on the glass surface. Specifically, the glass surface having been polished was observed by the reflection method while exposing the surface to halogen lamp of 300000 lx. Then, the number of large and fine scratches observed was expressed in terms of points, and the condition of the glass surface was graded by deducting points from 100. In this evaluation, the accuracy that is required for the fining polishing of glass substrates used in hard discs or LCDs was used as the basis for judgment.

Cleaning Property Evaluation

Cleaning property test was conducted for the surfaces having been polished using cerium-based abrasive which were obtained in the above embodiments and comparative examples. First, glass slides used for observation under an optical microscope were prepared, subjected to ultrasonic cleaning, and dried. Then, each of the cerium-based abrasive powder was dispersed in water to prepare an abrasive slurry with a concentration of 10% by weight. The dried glass slides were dipped into the respective abrasive slurry, drawn up from them, and fully dried with a drier so that the abrasive adhered to their surfaces; thus, test pieces for cleaning property test were prepared. The temperature of the glass slide atmosphere at the time of drying was set for 50° C. The prepared test pieces were subjected to ultrasonic cleaning for 5 minutes while immersed into deionized water in a beaker. After the ultrasonic cleaning, the glass slides were taken out from the beaker and washed with running water. The surfaces of the glass slides having been washed with running water were observed under an optical microscope, and the amounts of the abrasive particles remaining on the surfaces were evaluated.

The evaluation results of the coarse particle concentration, the average and maximum grain diameters, the dispersibility, and the abrasiveness of the abrasive are shown in Table 1.

It was also found that if the cerium-based abrasive according to the embodiment of this invention were used in polishing, satisfactory polished surfaces almost free from fine scratches could be obtained.

Comparing the abrasiveness (polishing values) shown in Table 1, it was found that the abrasive according to the embodiments of this invention, which underwent the lower-temperature re-roasting process, had higher polishing values than the abrasive according to Comparative Examples 1 to 3 and exhibited excellent abrasiveness. Thus, it was verified from the comparison between the abrasive according to the embodiments of this invention and those of Comparative Examples 1 to 3 that, while they were equivalent to each other in the presence or absence of scratches they caused on the polished surfaces since both of them underwent wet grinding, they were different in abrasiveness, depending on whether or not they underwent the lower-temperature

TABLE 1

| | Lower-temperature re-roasting conditions | | Coarse particle concentration (ppm) | Maximum grain diameter (μm) | Average grain diameter (μm) | Polishing value | Scratch evaluation | Cleaning properties |
|---|---|---|---|---|---|---|---|---|
| | Temperature (° C.) | Duration (h) | | | | | | |
| First Embodiment | 200 | 5 | 40 | 3.06 | 0.83 | 135 | E | G |
| Second Embodiment | 300 | 5 | 50 | 3.06 | 0.83 | 153 | E | G |
| Third Embodiment | 500 | 5 | 50 | 3.75 | 0.85 | 138 | E | G |
| Fourth Embodiment | 700 | 5 | 130 | 3.75 | 0.88 | 163 | G | G |
| Fifth Embodiment | 300 | 5 | 50 | 3.06 | 0.82 | 149 | E | G |
| Sixth Embodiment | 300 | 5 | 60 | 3.75 | 0.86 | 154 | E | G |
| Seventh Embodiment | 300–230 | less than 0.5 | 40 | 3.06 | 0.83 | 145 | E | G |
| Comparative Example 1 | — | — | 50 | 3.06 | 0.81 | 102 | E | G |
| Comparative Example 2 | — | — | 50 | 3.06 | 0.79 | 103 | E | G |
| Comparative Example 3 | — | — | 60 | 3.75 | 0.85 | 100 | E | G |
| Comparative Example 4 | 100 | 60 | 40 | 3.06 | 0.82 | 103 | E | G |
| Comparative Example 5 | 800 | 5 | 930 | 8.38 | 1.29 | 175 | P | G |

Scratch Evaluation
E: Almost neither large nor fine scratches were observed on the polished surface. The abrasive was very suitable for polishing the glass substrates used in hard discs or LCDs.
G: Almost no large scratches were observed, but only a few fine scratches were observed. The abrasive was suitable for polishing the glass substrates used in hard discs or LCDs.
F: Almost no large scratches were observed, but a number of fine scratches were observed. The abrasive was unsuitable for polishing the glass substrates used in hard discs or LCDs.
P: A number of large scratches were observed. The abrasive was unsuitable for polishing the glass substrates used in hard discs or LCDs.
Cleaning Properties
G: Almost no abrasive particles remained on the glass slide. The abrasive was very suitable for polishing the glass substrates used in hard discs or LCDs.
P: A number of abrasive particles remained on the glass slide. The abrasive was unsuitable for polishing the glass substrates used in hard discs or LCDs.

The coarse particle concentrations shown in Table 1 are those of the abrasive slurry prepared simply by mixing the cerium-based abrasive powders according to the above embodiments and comparative examples with deionized water and agitating the mixture. It was found that if the abrasive according to the embodiments of this invention were used, abrasive slurry with a low coarse particle concentration could be prepared simply by mixing the abrasive with water.

re-roasting process, and, on the whole, the abrasive according to the embodiments of this invention were superior to those according to Comparative Examples 1 to 3.

As in the case of Comparative Examples 4 and 5, it was found that even in the abrasive that underwent wet grinding and drying lower-temperature re-roasting process, those undergoing the process that was conducted under the conditions outside the preferable range had problems. Specifically, when the heating temperature was low in the process (Comparative Example 4), while the abrasive produced caused almost no scratches in the polished surface, its abrasiveness was inferior. And when the heating temperature was too high in the process (Comparative Example 5), while the abrasive produced had high abrasiveness, it caused scratches in the polished surface. This is possibly because at lower temperatures the change of rare earth hydroxides into oxides does not occur satisfactorily, whereas at higher temperatures the sintering of the raw material particles progresses, causing coarsened particles to be produced in the raw material.

What is claimed is:

1. A method for producing a cerium-based abrasive, comprising: a step of grinding raw material for a cerium-based abrasive; a step of roasting the ground raw material; and a step of subjecting the roasted raw material to wet processing, characterized in that it further comprises a lower-temperature re-roasting step of heating the wet-processed raw material at 200 to 700° C.

2. The method for producing the cerium-based abrasive according to claim 1, wherein the roasted raw material is subjected to wet grinding and/or wet classification as the wet processing.

3. The method for producing the cerium-based abrasive according to claim 1, wherein the heating duration in the lower-temperature re-roasting step is set at 0.5 to 60 hours.

4. The method for producing the cerium-based abrasive according to claim 1, wherein the wet-processed raw material is directly re-roasted at the lower temperature.

5. The method for producing the cerium-based abrasive according to claim 4, wherein the lower-temperature re-roasting step is conducted by spraying and heating the abrasive slurry formed through the wet processing.

6. The method for producing the cerium-based abrasive according to claim 1, further comprising a drying step between the wet processing step and the lower-temperature re-roasting step.

7. The method for producing the cerium-based abrasive according to claim 6, wherein the drying step is conducted by spraying and heating the abrasive slurry formed through the wet processing.

8. The method for producing the cerium-based abrasive according to claim 7, wherein the atmospheric temperature for drying the droplets formed by spraying the abrasive slurry is 120° C. to 300° C.

9. The method for producing the cerium-based abrasive according to claim 6, wherein the drying step is conducted by heating the abrasive slurry while applying vibration to said abrasive slurry.

10. The method for producing the cerium-based abrasive according to claim 9, wherein the atmospheric temperature for drying the abrasive slurry is 30° C. to 200° C.

11. The method for producing the cerium-based abrasive according to claim 6, wherein the abrasive slurry contain an organic solvent.

12. The method for producing the cerium-based abrasive according to claim 11, wherein the content of the organic solvent in the abrasive slurry is 0.1% by weight to 30% by weight prior to the drying operation.

13. The cerium-based abrasive produced by the method according to claim 1, wherein the cerium oxide content (by weight ratio to the total rare earth oxide content (hereinafter referred to as TREO) is 50 to 95%, the lanthanum oxide content (by weight ratio to TREO) is 5 to 50%, and the fluorine content (by weight ratio to the entire abrasive) is 5% or less.

* * * * *